United States Patent [19]

Johnson

[11] 4,258,983
[45] Mar. 31, 1981

[54] REAR VIEW MIRROR ASSEMBLY WITH SUPPORT MEANS CONNECTED TO VEHICLE DOOR AND BODY

[75] Inventor: James J. Johnson, Southfield, Mich.

[73] Assignee: General Motors Corporation, Detroit, Mich.

[21] Appl. No.: 82,794

[22] Filed: Oct. 9, 1979

[51] Int. Cl.³ .............................................. G02B 7/18
[52] U.S. Cl. .................................. 350/307; 248/486; 296/152
[58] Field of Search ............... 350/307, 304, 303, 302, 350/299; 248/486, 479, 476; 296/152

[56] References Cited

U.S. PATENT DOCUMENTS

| 2,708,086 | 5/1955 | Prutzman | 350/304 |
| 2,778,274 | 1/1957 | Behling | 350/307 |
| 3,377,117 | 4/1968 | Biscow | 350/307 |

FOREIGN PATENT DOCUMENTS 2726446  12/1978  Fed. Rep. of Germany ........... 350/307

Primary Examiner—Jon W. Henry
Attorney, Agent, or Firm—Edward J. Biskup

[57] ABSTRACT

A rear view mirror assembly that has a mirror pivotally supported adjacent the apex of a V-shaped linkage with one link of the linkage pivotally connected to the vehicle body at a point located forwardly of the door hinge and the other link pivotally connected to the door at a point located rearwardly of the door hinge so that opening of the door causes the included angle of the V-shaped linkage to decrease with the result that the mirror continues to present a view towards the rear of the vehicle to the seated driver.

3 Claims, 3 Drawing Figures

U.S. Patent  Mar. 31, 1981  4,258,983
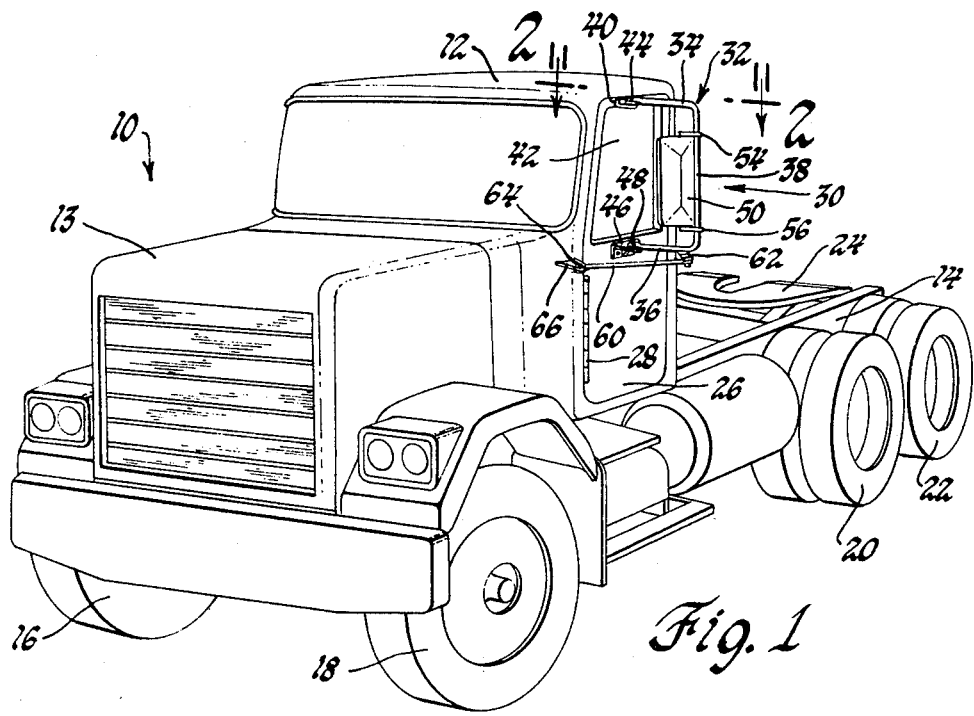
Fig. 1
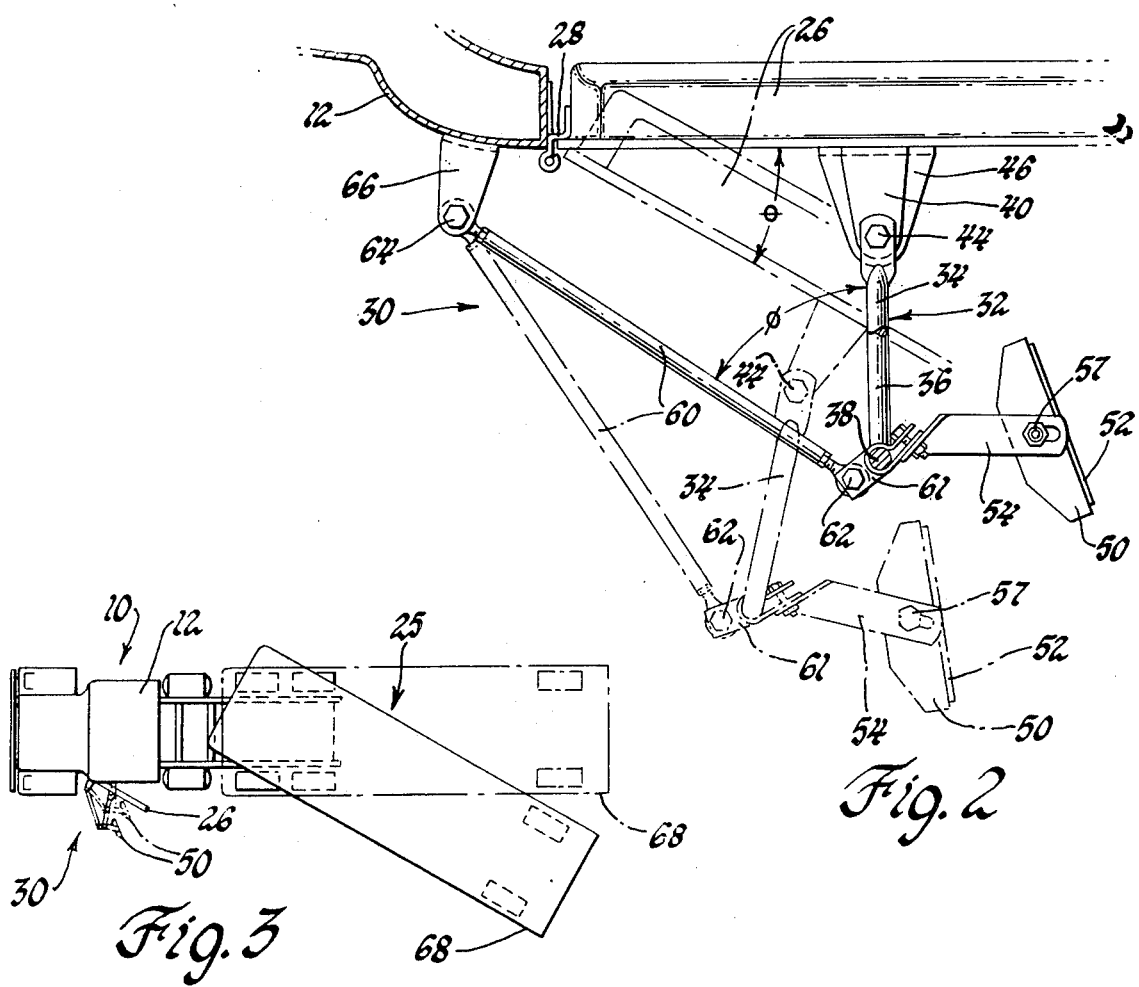
Fig. 2
Fig. 3

REAR VIEW MIRROR ASSEMBLY WITH SUPPORT MEANS CONNECTED TO VEHICLE DOOR AND BODY

This invention relates to rear view mirrors and more particularly concerns an outside rear view mirror assembly adapted to be mounted on the door of the tractor portion of a semitrailer combination and that includes a unique support linkage which positions the mirror for improved rearward vision when the door is opened so as not to require the driver to "hang out" the door to see if the trailer is backing up properly.

In the preferred form, the rear view mirror assembly according to the present invention includes a support having inner and outer ends with the former being connected to the door of the tractor for pivotal movement about a vertical axis spaced rearwardly from the vertical axis about which the door is hinged. The outer end of the support has a mirror pivotally connected thereto that is movable about a vertical axis to present a desired view to the rear of the tractor-trailer combination. A link is pivotally connected at one end to the outer end of the support adjacent the mirror while the inner end of the link is pivotally connected to the tractor at a fixed point thereon located forwardly of the door hinge axis. The arrangement is such that upon opening the door, the support moves towards the door and thereby causes the mirror to move outwardly relative to the tractor and at the same time minimizes the mirror's angular movement relative to the tractor so as to provide a rear view for the driver of the rear end of the trailer when the latter is angled relative to the tractor.

The objects of the present invention are to provide a new and improved articulated rear view mirror assembly for a vehicle door which automatically maintains a view towards the rear of the vehicle for the driver when the door is opened; to provide a new and improved rear view mirror assembly having a control linkage which causes the mirror to pivot about a vertical axis towards the door when the latter is opened so as to provide the seated driver with an improved view towards the rear of the vehicle; to provide a new and improved rear view mirror assembly for the tractor portion of a semitrailer combination that has a mirror support movable through a link towards the driver as the door is being opened so as to position the mirror laterally outwardly relative to the tractor portion while maintaining a view towards the rear of the trailer; to provide a new and improved mirror assembly that has a mirror pivotally supported adjacent the apex of a V-shaped linkage with one link of the linkage pivoted on the vehicle body forwardly of the door hinge and the other link pivoted to the door rearwardly of the door hinge so that opening of the door causes the included angle of the V-shaped linkage to decrease so that the mirror continues to present a view towards the rear of the vehicle.

Other objects and advantages of the present invention will be apparent from the following detailed description and drawing in which:

FIG. 1 shows a tractor portion of a tractor-trailer combination incorporating a rear view mirror assembly made in accordance with the present invention;

FIG. 2 is an enlarged view taken on lines 2—2 of FIG. 1 showing the rear view mirror assembly when the driver's door is partially opened and fully closed; and FIG. 3 is a view of a tractor-trailer vehicle with the trailer portion angled relative to the tractor portion.

Referring now to the drawings and more particularly FIGS. 1 and 2 thereof, a conventional tractor vehicle 10 is shown having an operator's cab 12 and hood 13 mounted on a chassis having a frame 14, the front end of which is provided with a pair of steerable wheels 16 and 18 and the rear end of which supports tandem driving wheels 20 and 22 on each side thereof. Above the tandem wheels 20 and 22, a fifth wheel assembly 24 is mounted on the frame and serves as one part of a coupling that supports a trailer 25 such as seen in FIG. 3 in the usual manner. The driver's side of the cab 12 includes a door 26 which is hinged in the conventional manner for movement between the closed position shown and an open position. As seen in FIG. 2, hinge means 28 connect the front edge of the door 26 to the body portion of the cab 12 for movement about a vertical axis from the full-line position shown to various open positions one of which is shown in phantom lines.

As best seen in FIG. 1, a rear view mirror assembly 30 made according to the present invention is shown mounted on the door 26 and includes a U-shaped support member 32 comprising upper and lower parallel horizontally oriented arms 34 and 36 integral with a vertically oriented base member 38 all of which lie in a common plane. A bracket 40 fixed to the frame of the door 26 above the window 42 is connected to and supports the inner end of the upper arm 34 by a vertically oriented pivotal connection 44. Similarly, a bracket 46 fixed to the door 26 below the window 42 is connected to and supports the inner end of the lower arm 36 through a vertically oriented pivotal connection 48. Accordingly, the support member 32 can be pivoted about a substantial vertical axis passing through the pivot connections 44 and 48.

A generally rectangular mirror housing 50 having a mirror element 52 fixedly mounted has its upper and lower portions connected by a pair of identical and vertically spaced brackets 54 and 56 to the base member 38 of the support member 32. Each bracket 54 and 56 includes a pivot connection 57 which permits adjustable movement of the mirror housing 50 about a vertical axis to present a desired view to the rear of the vehicle. In addition, a link 60 is provided, the outer end of which is connected to a tang 61 fixed with lower arm 36 of support member 32 by a pivotal connection 62 while the inner end extends forwardly and is connected through a pivotal connection 64 to a bracket 66 secured to the fixed body portion of the cab 12 forwardly of the door hinge 28.

From the above description and as seen in FIG. 2, it should be apparent that with the door 26 in the closed position, the vehicle operator can adjust the mirror housing 50 about a vertical axis provided by base member 38 so as to present a desired view to the rear of the vehicle. Afterwards when the door 26 is moved to the phantom line position, the link 60 causes the support member 32 to pivot in a counterclockwise direction about the vertically aligned pivotal connections 44 and 48 and thereby maintains the mirror in substantially the same angular position relative to the cab 12. In this instance, the angle $\theta$ is approximately 30° and, of course, increases with continuing opening movement of the door 26. On the other hand, the angle $\phi$ decreases as the door moves from the closed position to the open position. It should also be apparent that the articulated movement of the support member 32 occurs due to the fact that the pivotal connection 64 at the inner end of the link 60 is at a fixed nonmovable point on the vehicle body forwardly of the door hinge axis. Moreover, depending on how far forward the pivotal connection 64 is located relative to the door hinge axis will determine the amount of counterclockwise movement that the support member 32 realizes during opening of the door 26.

As alluded to hereinbefore, one advantage of the control linkage incorporated with the mirror assembly 30 is that by having the driver open the door slightly, the mirror element 52 moves laterally outwardly with minimum angular movement thereof relative to the vehicle and thereby provides a rear view for the operator without requiring him to "hang out" of the doorway and turn his head to the rear while backing up the tractor-trailer combination. In other words, as seen in FIG. 3, when the trailer 25 is angled as shown relative to the tractor 10, the vehicle operator can remain seated, open the door 26 slightly and see the area adjacent the rear corner 68 of the trailer 25 to make certain that he is properly backing up.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a vehicle having a body portion provided with a door adapted to be moved relative to said body portion about a first vertical axis between an open position and a closed position, a mirror, support means having one end thereof connected to said door for pivotal movement about a second vertical axis spaced rearwardly from said first vertical axis and having the other end extending laterally outwardly relative to said door, means connecting said mirror to the other end of said support means for adjustable movement about a third vertical axis to present a desired view to the rear of the vehicle, and a link having one end pivotally connected to the body portion forwardly of said first vertical axis and having the other end pivotally connected to said support means whereby movement of said door from the closed position to the open position causes said support means to pivot about said second vertical axis towards said door so that the mirror maintains substantially the same angular position relative to the body portion of the vehicle.

2. In combination with a vehicle having a body portion provided with a door adapted to be moved relative to said body portion about a first vertical axis between an open position and a closed position, a mirror, a U-shaped support member including upper and lower arms joined to a vertically orientated base member, means connecting said upper and lower arms to said door for pivotal movement about a second vertical axis spaced rearwardly from said first vertical axis with said base member extending laterally outwardly relative to said door, means connecting said mirror to the base member of said support member for adjustable movement about a third vertical axis to present a desired view to the rear of the vehicle, and a link having one end pivotally connected to the body portion forwardly of said first vertical axis and having the other end pivotally connected to said support member whereby movement of said door from the closed position to the open position causes said support member to pivot about said second vertical axis towards said door so that the mirror maintains substantially the same angular position with respect to the body portion of the vehicle.

3. In combination with a vehicle having a body portion provided with a door adapted to be moved relative to said body portion about a first vertical axis between an open position and a closed position, a mirror, a U-shaped support member including upper and lower parallel arms joined to a vertically orientated base member, bracket means connecting said upper and lower arms to said door for pivotal movement about a second vertical axis spaced rearwardly from said first vertical axis with said base member extending laterally outwardly relative to said door, means connecting said mirror to the base member other end of said support member for adjustable movement about a third vertical axis to present a desired view to the rear of the vehicle, and a link having one end pivotally connected to a fixed part of the body portion located forwardly of said first vertical axis and having the other end pivotally connected to said lower arm of the support member adjacent the mirror whereby movement of said door from the closed position to the open position causes said support member to pivot about said second vertical axis towards said door so that the mirror maintains substantially the same angular position with respect to the body portion of the vehicle.

* * * * *